United States Patent [19]

Sato

[11] Patent Number: 4,491,911
[45] Date of Patent: Jan. 1, 1985

[54] DATA PROCESSING SYSTEM WITH IMPROVED ADDRESS TRANSLATION FACILITY

[75] Inventor: Fumitaka Sato, Oume, Japan

[73] Assignee: Tokyo Shibaura Denki Kabushiki Kaisha, Kawasaki, Japan

[21] Appl. No.: 351,859

[22] Filed: Feb. 24, 1982

[30] Foreign Application Priority Data

Mar. 3, 1981 [JP] Japan .................................. 56-29349

[51] Int. Cl.³ .......................... G06F 13/00; G06F 9/30
[52] U.S. Cl. .................................................. 364/200
[58] Field of Search ... 364/200 MS File, 900 MS File

[56] References Cited

U.S. PATENT DOCUMENTS

| | | | |
|---|---|---|---|
| 3,947,823 | 3/1976 | Padegs et al. | 364/200 |
| 4,084,230 | 4/1978 | Matick | 364/200 |
| 4,145,738 | 3/1979 | Inoue et al. | 364/200 |
| 4,155,119 | 5/1979 | De Ward et al. | 364/200 |
| 4,277,826 | 7/1981 | Collins et al. | 364/200 |
| 4,347,565 | 8/1982 | Kaneda et al. | 364/200 |
| 4,355,355 | 10/1982 | Butwell et al. | 364/200 |
| 4,373,179 | 2/1983 | Katsumata | 364/200 |
| 4,376,297 | 3/1983 | Anderson et al. | 364/200 |

FOREIGN PATENT DOCUMENTS 55-58879  5/1980  Japan .................................. 364/200

OTHER PUBLICATIONS

"A Guide to the IBM 4341 Processor", (GC20-1877-0), IBM Corp., Apr. 1979, Section 10:10 Storage (pp. 52-55), Section 15:15 (pp. 134-144), also pp. 127-129.

Primary Examiner—James D. Thomas
Assistant Examiner—Mark P. Watson
Attorney, Agent, or Firm—Oblon, Fisher, Spivak, McClelland & Maier

[57] ABSTRACT

A data processing system including a central processing unit (CPU) having an operating system to process information, and a main memory coupled to the CPU to store information, wherein the CPU accesses the main memory by means of an actual address after translating an associative address into the actual address by means of the operating system. To that end, the CPU includes a dynamic address translator having a page table addressed by the associative address and outputting a portion of the actual address when being addressed by the associative address. A remaining portion of the actual address is derived from the associative address itself.

1 Claim, 9 Drawing Figures

DATA PROCESSING SYSTEM WITH IMPROVED ADDRESS TRANSLATION FACILITY

BACKGROUND OF THE INVENTION

1. Field of the Invention

This invention relates to data processing systems, and more particularly to an address translator for an associative memory system of a data processing system.

2. Description of the Prior Art

The associative memory system is used to increase the amount of memory available to the user beyond that which is actually present in the main memory of the system. Conventionally, a central processing unit (CPU) includes a dynamic address translator (DAT) to translate automatically a user associative memory address into an actual memory address of the data processing system employing the associative memory system.

FIG. 1 illustrates a data processing system of the prior art. The data processing system includes the central processing unit (CPU) 11, an input/output channel (I/O channel) 10 and a main memory (MM) 14. A page table 15 is stored in a portion of the main memory 14 to maintain the relationship between the associative address and the actual address. The address relationship is usually divided into two tables, one of which is called a segment table and the other is called the page table. In this instance, the two tables combined will be referred to as the page table. The CPU 11 has a dynamic address translator (DAT) 12 to translate the associative address into the actual address in referring to the page table 15. In general, the DAT 12 has a hardware portion called a translation look aside buffer (TLB) 13 for improving the speed of the address translation by storing a recently accessed portion of the page table 15 therein. This associative addressing system and the hardware thereof is well known to those skilled in the art, and though they are not explained here, for instance, they are explained in the manual titled "A guide to the IBM 4341 Processor Section 15" (GC20-1877) published by the IBM corporation.

The architecture of the prior art systems reduced hardware costs somewhat and improved the speed of the address translation as was then possible, with the then available semiconductor elements. However, recently new semiconductor memory elements have been developed and it is possible to obtain a much less expensive memory element with both a larger memory capacity and a much faster memory access time. In view of these recent developments in hardware technology, the prior art address translation systems and related hardware configuration no longer provide the most efficient operation.

Recently disclosed in my related copending U.S. patent application Ser. No. 305516, 10-5-81, now abandoned, corresponding to Japanese patent application Ser. No. 55-137575 is a data processing system that enables the user to use the main memory effectively with their user program by a system of address translation utilizing the benefits of recent developments in semiconductor technology. In the address translation of the prior art devices, the operating system (OS) can be used to design and revise the page table with general instructions, because the page table is stored in the main memory. However, the page table in the present invention is not included in the main memory which up until now made it impossible to address the page table with general instructions. The prior art technology currently uses the operating system (OS) to perform paging by relating a total group of pages to each other in order to improve efficiency. It is important to further improve efficiency such that the OS performs the total paging for a plurality of pages, without storing the page table in the main memory.

SUMMARY OF THE INVENTION

It is accordingly a principal object of this invention to provide a novel translator to translate an associative address into an actual address for a data processing system using an associative memory system.

It is another object of the invention to provide a novel operating system for a data processing system which may be used to freely revise the page tables for the total paging.

It is still another object of the invention to provide a new and improved data processing system which enables user program access of the main memory by means of a simple hardware architecture for the dynamic address translator without losing total paging.

In order to attain the above objects, the data processing system of the invention includes a central processing unit, a memory unit for storing data with an associative address designated by an instruction which includes an associative address portion and a portion to designate the register which contains the associative address, a bus connected between the central processing unit and memory unit, a data transfer device for transferring information through the bus under control of the central processing unit, and an addressing means for addressing the memory unit by means of the associative address portion of the instruction both in the event of a translation from the associative address to an actual address and in the event of a revision of the contents of the memory unit.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENT

Figure 1:
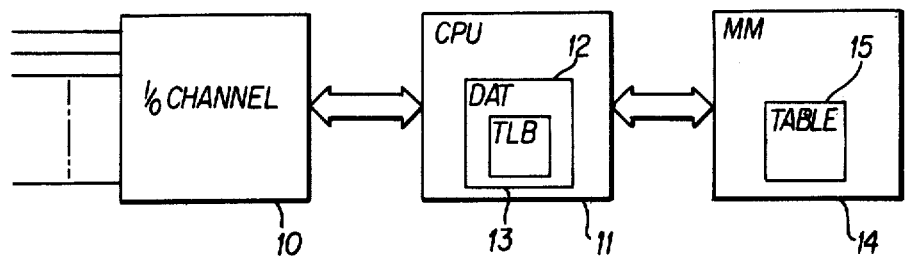
FIG. 1 is a block diagram of a prior art data processing system using associative addressing.
Figure 2:
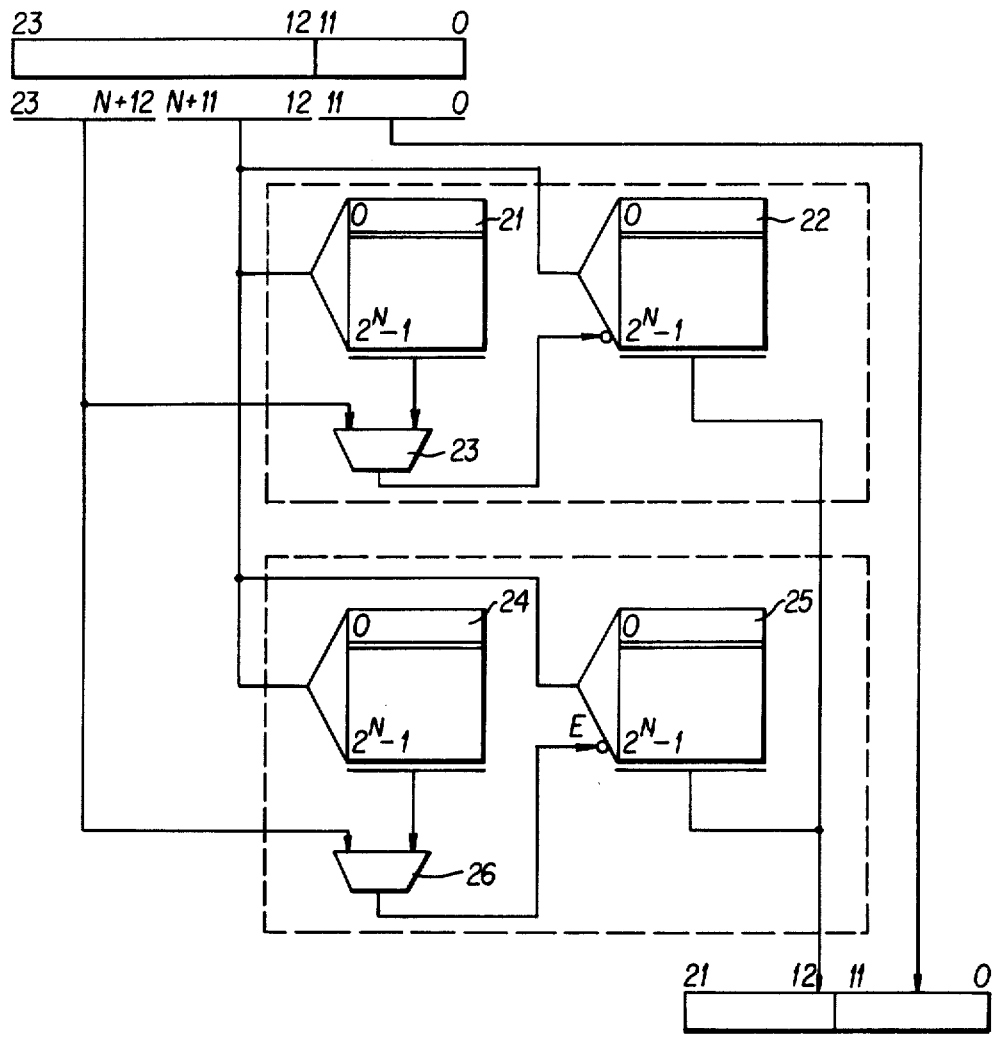
FIG. 2 is a system configuration of a translation look aside buffer (TLB) of the prior art.

Referring now to the drawings, wherein like reference numerals designate identical or corresponding parts throughout the several views, and more particularly to FIG. 2 thereof, the translation look aside buffer (TLB) 13 of the prior art is shown for comparison with the present invention. In FIG. 2, the TLB 13, which has a total space of 16 megabytes (MB) divided into 4,000 pages of 4 kilobytes (KB) and addressed by the associative address of 24 bits, translates the associative address into the actual address of a maximum of 4 (MB). The TLB 13 uses a set associative system like other TLB's well known in the art. The memories 21 and 24 store the upper bits of the associative address recently accessed and the memories 22 and 25 store the upper bits of the actual address corresponding to the associative address. For instance, the memories have a capacity of $2^N$ words. The portion of the associative address exclusive of the lower portion (in this case 12 bits) is called the page number portion. The page number portion of the associative address addresses the memory 21, 23, 24 and 25, and the comparators 23 and 26 respectively compare the page numbers portion with upper bits of the associative address stored in memories 21 and 24. The outputs of the comparator 23 and 26 are connected to the respective enable terminals of the memory 22 and 25. Therefore if the comparator 23 detects a coincidence, the corresponding actual address of the associative address is read from the memory 22. If the comparator 26 detects a coincidence, the corresponding actual address to the associative address is also read from the memory 25.

Figure 3:
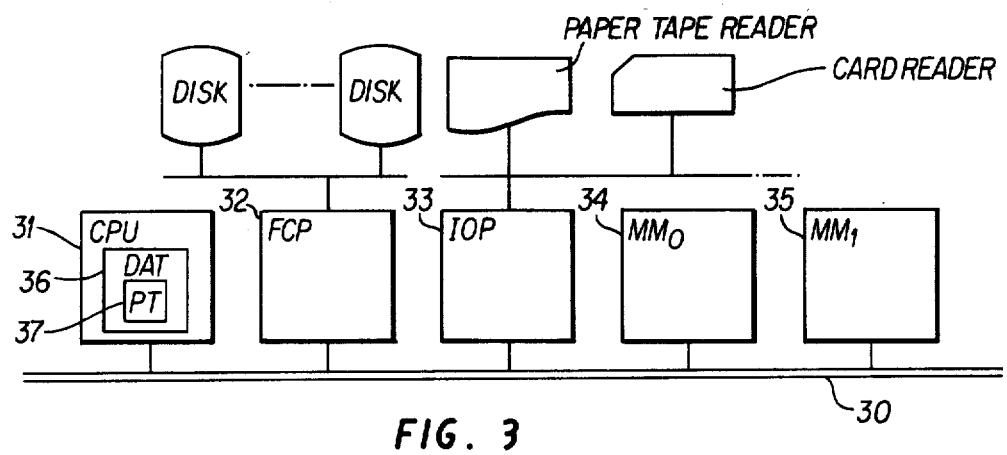
FIG. 3 is a block diagram of one embodiment of the data processing system of the present invention.
Figure 4:
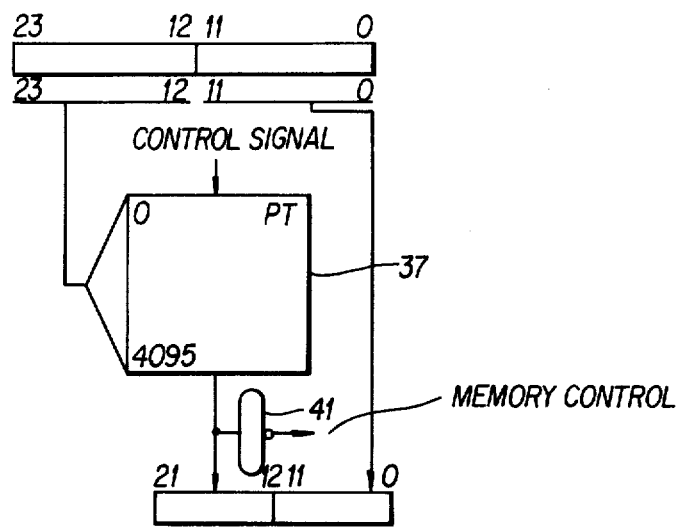
FIG. 4 is a system configuration of one embodiment of the address translator of the present invention.

In FIG. 3, the data processing system of one embodiment of this invention is shown. In the figure, the CPU 31 is connected to a file control processor (FCP) 32, an input and output processor (IOC) 33 and main memory modules $MM_0$ 34 and $MM_1$ 35 through common bus 30 having a so called, uni-bus architecture. The CPU 31 includes the dynamic address translator (DAT) 36. Most of the DAT is a memory of the page table (PT) 37. The DAT 36 as shown in FIG. 4 has the lower 12 bits (11 - 0) of the associative address corresponding to the lower 12 bits of the actual address. The upper 12 bits (23 - 12) of the associative address are used to address the page table (PT) 37. The output of the PT 37 is used not only as the upper 10 bits (21 - 12) of the actual address but also as an input to the driver 41. The output of the driver 41 is connected to an internal bus (not shown) of the CPU and controls a microprogram of the CPU 31 to be able to read the output of the PT 37 under the control of the internal signals of the CPU. The microprogram of the CPU 31 can write the desired data to the PT 37 to which the internal bus of the CPU 31 is connected. The PT 37 has a memory capacity of 4,096 words. When the most significant upper portion of the associative address of the instruction is reserved as a bit position, but not actually used in the address translation, it is possible to save hardware in the PT 37 to accommodate only the number of bit positions in the associative address actually being used.

Figure 5:
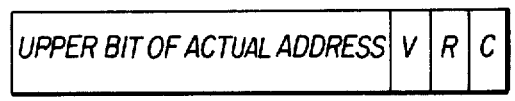
FIG. 5 illustrates the format of one word of the page table in the address translator of the present invention.

FIG. 5 shows the format of data stored in the PT 37. Each word of the PT 37 includes the upper bits of the actual address and three control bits V, R and C. The bit V is a validity bit to indicate that the upper bits of the actual address included in the word should be effective. The bit R is a reference bit to be set to "1" everytime the word is accessed. The bit C is a change bit to be set to "1" everytime the word is accessed for writing.

Referring to FIG. 4, the operation of the DAT 36 when the CPU 31 accesses the main memory by designating the associative address will be explained. The bits 23-12 of the associative address from the CPU 31 address the PT 37 whose output becomes the bits 21-12 of the actual address. The bits 11-0 of the actual address correspond to the bits 11-0 of the associative address. The actual address thus obtained is used to address to the main memory module 34 and 35 via the bus 30 shown in FIG. 3. In this embodiment, the FCP 32 and IOP 33 also address the main memory modules 34 and 35 with the actual address, because the CPU 31 preliminarily translates the associative address into the actual address by means of software when it transfers a channel program to the FCP 32 and IOP 33 for execution thereby.

In the address translation system of the prior art it is necessary to revise the flags such as the R and the C bits by reading the actual address from the page table of the main memory if a page stored outside the TLB is accessed because a part of the page table is stored within the TLB. However, in the embodiment of the present invention, it is not necessary to access the main memory for the address translation because all of the page table 37 is stored within the DAT 36. Therefore, the performance of the data processing system of this invention is improved by reducing the time for associative address translation.

It is apparent from FIG. 4 that the DAT 36 is simplified. Almost all the the DAT 36 is taken up by the PT 37. Using a memory element of 1K words, the size of the PT 37 is twice the capacity of the memory 22 and 25 in the TLB of the prior art. The DAT 36 can be architectured as a hardware equivalent of the TLB 13 of the prior art, except that the DAT 12 of the prior art includes not only the TLB 13 but also an adder and a register for address calculation to access the PT 15 in the main memory, an access control circuit for the main memory, and a sequential control circuit etc. Therefore, by putting the page table into the DAT 36 and not into the main memory, the circuits needed to access the main memory as mentioned above become unnecessary and the amount of hardware is reduced by approximately one-half. In the near future, when high speed static RAM (random access memory) elements become available having a large capacity of 4K words×4 bits, the advantages of this invention will increase because one memory 22 in the TLB of FIG. 2 will be similar in size to the PT 37 in FIG. 3.

Figure 6:
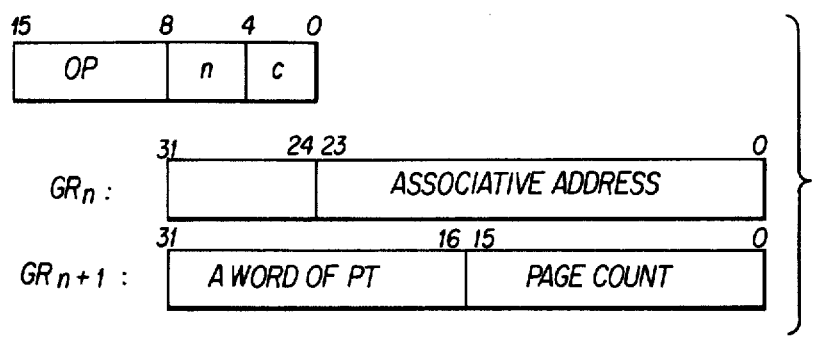
FIG. 6 illustrates the format of an instruction for operation of the page table of the present invention and illustrates the use of the general register with an instruction for the page table.

Nextly referring to FIG. 6, the PTH instructions will be explained as follows. The format of the PTH instruction and its usage in connection with a general register are shown in FIG. 6. The PTH instruction is designed to provide the operating system with the capability to define and revise the page table PT 37 within the DAT 36. When initialization takes place for the CPU, it is very convenient to use software for addressing the PT in the event that firmware is provided to write such contents to obtain the actual address corresponding to the associative address within the actual memory of the PT 37. The PTH instruction has an instruction code (OP), an (n) portion to indicate the general register associated with it, and a final portion (c) which broadens the capability of the PTH to be able to undergo self-modification. With respect to the PTH instruction, the general register GRn stores the associative address and the general register GRn+1 stores a word of the PT in the upper 16 bits and a page count in the lower 16 bits. Although in this embodiment, the associative address is in the general register, it is possible to design an instruction format to designate an associative address by a portion of the instruction word. The PTH instruction may be varied in dependence on the state of the C bit as follows: (each word in the page table is defined as a page table entry PTE)

- When C=1, the page table entries are set by writing the upper 16 bits of the general register GRn+1 into the PTE designated by the associative address in the general register GRn. IF the lower 16 bits of the GRn+1 registers are not zero, the writing is repeated as many times as the number designated by the GRn+1 register, the address of the PT and the upper bits of the actual address in the GRn+1 register being incremented after every repetition.
- When C=2, the page table entries are to be read by setting the PTE designated by the associative address in the GRn register to the upper 16 bits of the GRn+1 register. If the lower bits of the GRn+1 register are not zero, but are equal to a positive integer m, the m numbers of the control bits V, R and C in the PTE succeeding to the above said PTE are logically summed with the control bits of the GRn+1.
- When C=3 the Reference Bits are reset by resetting the R bit of the PTE, designated by the associative address in the GRn register to zero. If the GRn+1 register is not zero but the positive integer m, reset the m number of the R bit in the PTE succeeding to the above said PTE.

In the variations where C=1 and C=2, the lower 16 bits of the GRn+1 register designates the number of repetitions to handle the total number of pages. Therefore, in the variation where C=1, a continuous page in the associative address space can easily be made to correspond to a continuous page in the actual address space. Therefore in the variation of C=2 it is easy to obtain the control bits R and C for a corresponding page from the total page group.

Figure 7:
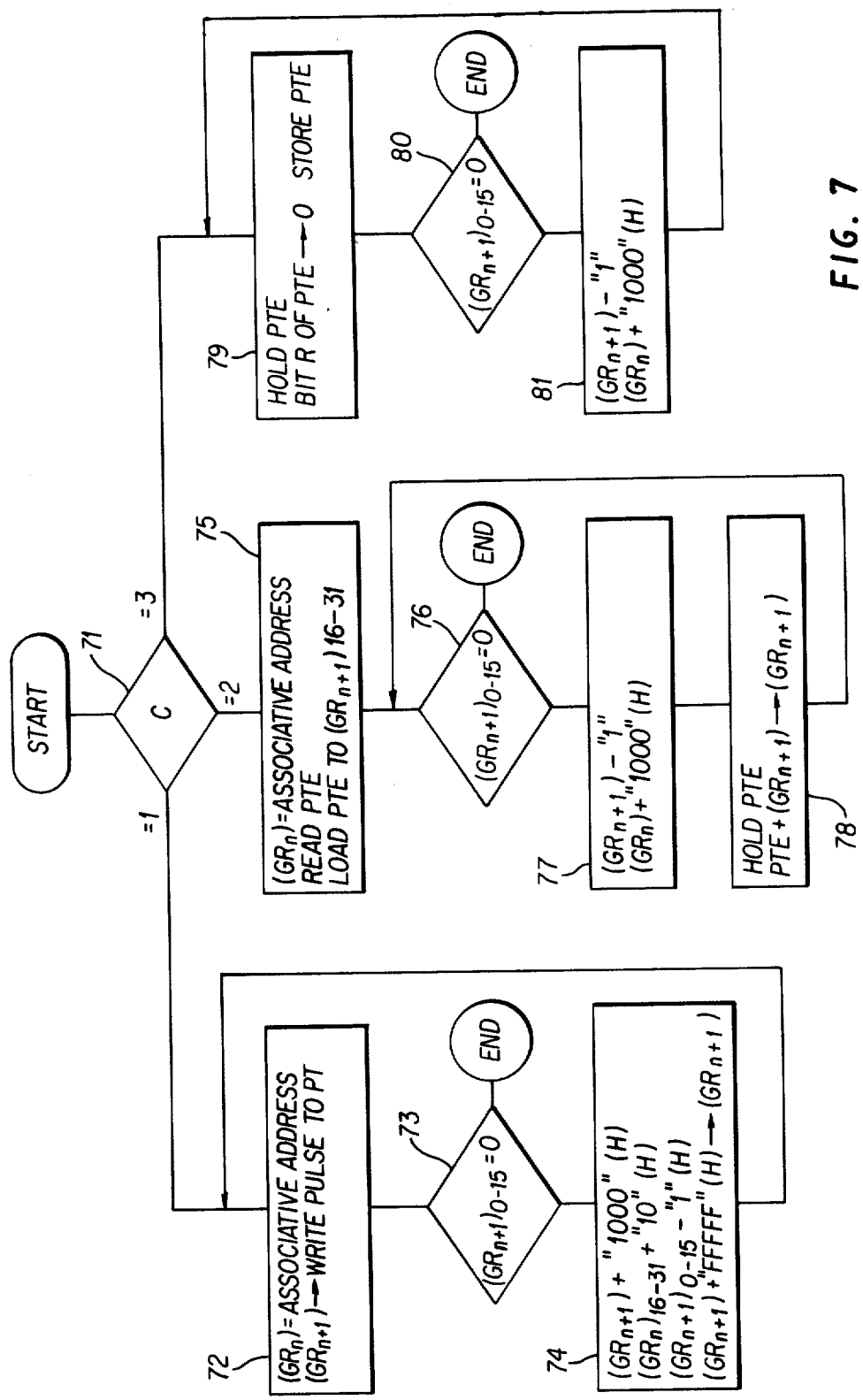
FIG. 7 is a flow chart for processing of an operation instruction of the page table for the present invention.

FIG. 7 shows a flow chart of one embodiment of the PTH instruction. There will be explained in more detail this embodiment of the PTH instruction. At the step 71 which type of variation and the corresponding value for the control bit C is decided. At the step 72, when the control bit is C=1, the content of the GRn register is given as the associative address in FIG. 4 and the contents of the GRn+1 register generates a write pulse through the CPU bus to the page table. At the step 73 the PTH instruction terminates if the lower 16 bits of the GRn+1 register are equal to zero. At the step 74 the contents of the GRn+1 register are added to "1000" (H: indication of hexadecimal), the upper 16 bits of the GRn register are added to "10" (H), and the lower 16 bits of the GR$_{n+1}$ register are decreased by "1". The value "FFFFF" is added to the total of the GRn+1 register which contains the results of the two above mentioned calculations. If the control bit is C=2, at the step 75 the content of the GRn register is given as the associative address in FIG. 4, the PTE indicated by the bit 23-12 is read from the PT 37 and is transferred through the CPU bus by enabling the driver 41. The contents of the CPU bus are loaded into the upper 16 bits of the GRn+1 register. The lower 16 bits of the GRn+1 register are not changed. The step 76 is the same as the above mentioned step 73. At the step 77 the contents of the GRn+1 register are decreased by "1" and the contents of the GRn register are increased by "1000" (H). At step 78, as in step 75, an arithmetic unit of the CPU holds the PTE indicated by the bits 23-12 of the GRn register, and after a portion of it except by the bit 19-16, is made zero, the logical sum of the PTE and contents of the GRn+1 register is determined and the result is loaded into the GRn+1 register. If the control bit is C=3, at the step 79, as in step 75, the arithmetic unit of the CPU holds the PTE indicated by the bit 23-12 of the GRn register, and the control bit R (bit 18) of the PTE is reset and is stored at the same address of the PT 37 again. The step 80 is the same as step 73 and the step 81 is the same as the step 77.

Figure 8:
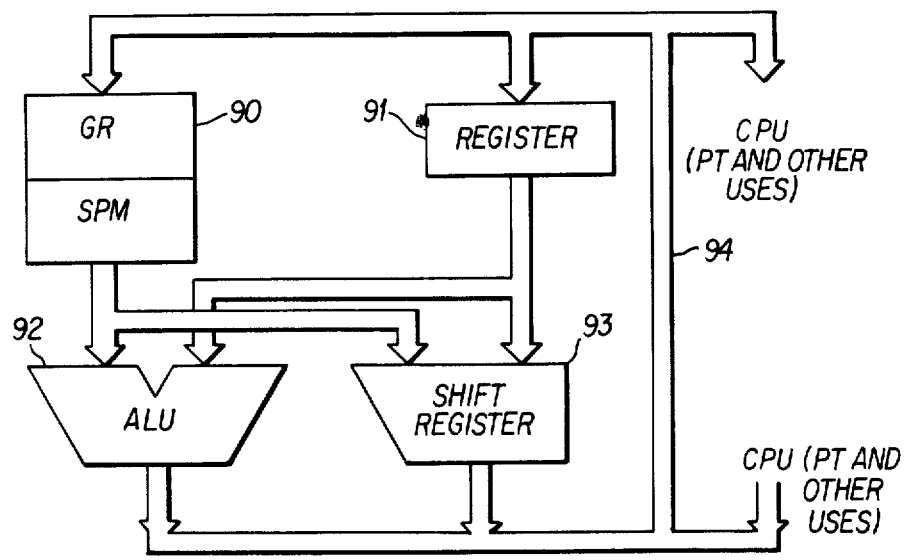
FIG. 8 is a block diagram of the CPU which performs the Page Table Entry instruction for the present invention.

FIG. 8 shows a block diagram of that portion of the CPU 31 relating to the performance of the PTH instruction. The CPU 31 has a high speed memory 90 a part of which is used as the general register GR and the remainder of which is used as a scratch pad memory (SPM). The output of the memory 90 is connected to an arithmetic logical unit (ALU) 92 and a shift register 93. The shift register 93 has its other input applied thereto from the register 91 which stores a result under calculation. The outputs of the ALU 92 and the shift register 93 are supplied to various circuits of the CPU (not shown).

Figure 9:
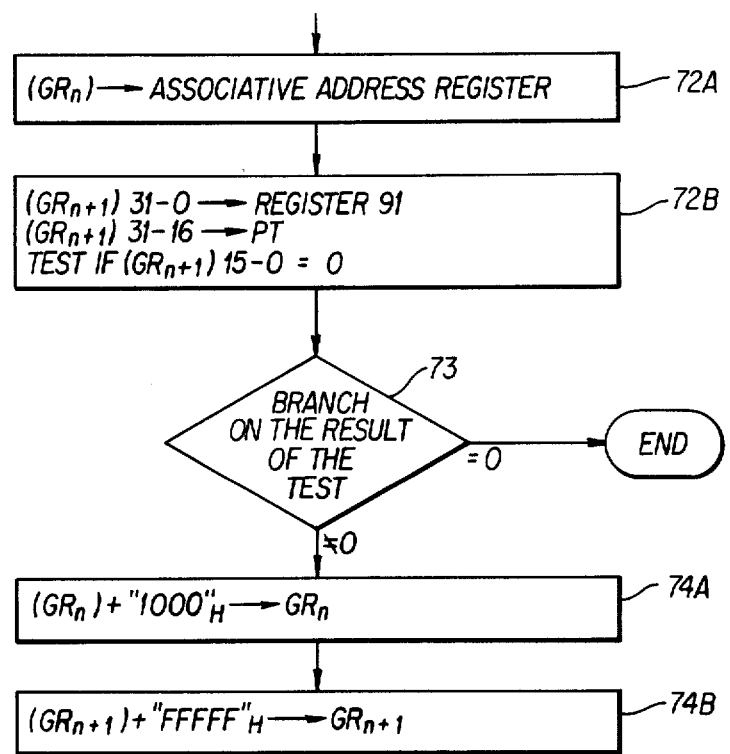
FIG. 9 is a flow chart of the operation to perform the Page Table Entry instruction of the present invention.

There will be explained in the following discussion the operation of the circuit shown in FIG. 8, for instance, when the control bit is C=1. The flow chart shown in FIG. 9 explains in detail the operation between the step 72 and the step 74. The step 72 and 74 shown in FIG. 7 has two microsteps A and B. The associative address register in the microstep 72A is equal to the associative address register shown in above portion of the FIG. 4. At the step 73 performed by one microstep, a branch takes place depending on the result of the test in the microstep 72B. A branch is performed both at the step 71 in FIG. 7, according to the condition of the control bit C and at the step 73 by a circuit called a microprogram sequencer. At step 74A the addition of "1000" (Hexidecimal) to the GRn register is performed to insure a "1" is present at the carry input of the ALU (bit 12) through an OR gate from an instruction of the microprogram. At step 74B the addition of "FFFFF" (Hexadecimal) to the register 91 is realized so as to add the pattern "FFFFF" (Hexadecimal) stored in the scratch pad memory SPM constantly to contents of the register 91.

The microprogram initializes the system when the power source is turned on and the page table PT as the associative address is same as to the actual address within an actual capacity of the main memory. Immediately after initialization, the software can start the system with addressing by the associative address.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A data processing system, comprising:
   a central processing unit (CPU), an input and output processor (IOP), main memory modules, and a common bus for coupling said CPU, said IOP and said main memory modules to each other;
   said CPU including a dynamic address translator (DAT) to translate automatically an associative memory address into a respective actual memory address, said DAT comprising, a first register means for storing an associative address including an associative address portion and an actual address portion, a page table addressed by said associative address portion for storing page table entries each including predetermined bits of a respective actual address and plural predetermined control bits, said page table outputting said predetermined bits of said actual address and said plural predetermined control bits upon being addressed by said associative address portion, and second register means for storing said actual address portion of said associative address and said predetermined bits of said actual address outputted by said page table when said page table is addressed by said associative address portion to produce an actual address, said second register means addressing said memory modules with said actual address; and said CPU comprising an operating system for processing information, including plural general registers and means for generating a PTH instruction for defining and revising said page table entries, said PTH instruction including an instruction code, a first control portion for identifying a first general register storing an associative address associated with said instruction code and a second general register for storing a page table entry and a page count, and a second control portion for enabling the PTH instruction to undergo self-modification, and means for setting, reading and resetting the page table entry in the page table corresponding to the instruction code based on said second control portion of said PTH instruction.

* * * * *